R. Berryman,
Valve.
No. 111,032. Patented Jan. 17, 1871.
2 Sheets. Sheet 1.
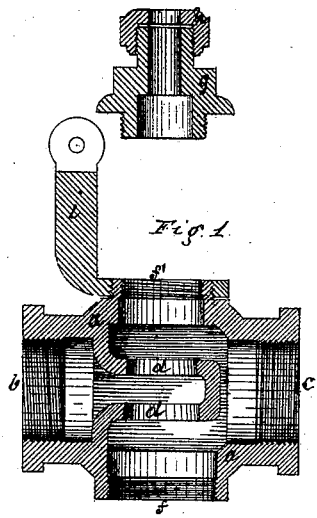
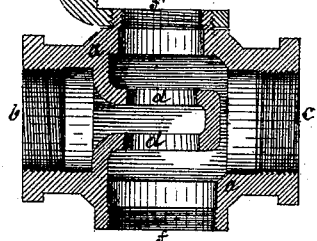
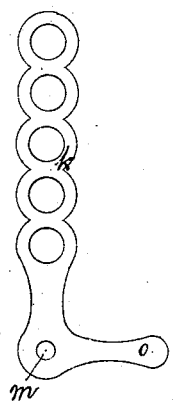
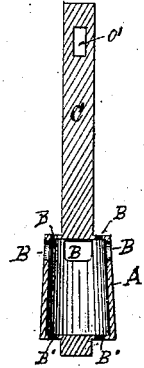
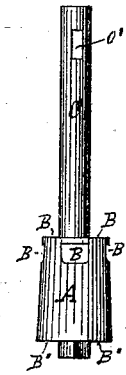
Witnesses.
Inventor.
Robert Berryman R. Berryman,
Valve.
No. 111,032.
Patented Jan. 17, 1871.

Witnesses.

Inventor.
Robert Berryman

United States Patent Office.

ROBERT BERRYMAN, OF HARTFORD, CONNECTICUT, ASSIGNOR TO THE BERRYMAN REGULATOR AND ALARM COMPANY, OF SAME PLACE.

Letters Patent No. 111,032, dated January 17, 1871.

IMPROVEMENT IN WATER OR STEAM-VALVES.

The Schedule referred to in these Letters Patent and making part of the same.

*To all whom it may concern:*

Be it known that I, ROBERT BERRYMAN, of the city and county of Hartford and State of Connecticut, have invented certain new and useful Improvements in Water or Steam-Valves; and to enable others skilled in the art to make and use the same I will proceed to describe, referring to the drawing, in which the same letters indicate like parts in each of the figures.

This invention relates to that class of valves which has one solid conical plug or valve to open and close two openings at the same time, and which has proved, as heretofore made, insufficient, for the reason that a large movement of the valve or plug is required to allow the full flow of the fluid between its body and its openings or seats; and even then the full capacity of the induction cannot pass through the valve.

The nature of this invention consists in forming a conical hollow cylindrical valve, having port-openings in each end and through its periphery near its upper or smaller end, so that, by a short downward movement or opening of the valve, it will allow of a full flow of fluid equal to the capacity of the induction and eduction-pipes which conduct the fluid into and from the valve.

In the accompanying drawing, sheet 1—

Figure 1 shows the body of the valve.

Figure 4 shows the cap which closes the upper portion of the valve, and the packing-box through which the valve-rod plays.

Figure 5 is a cap which closes the port at the under side of the valve.

Figure 6 is an actuating angle-lever.

Sheet 2—

Figure 8:
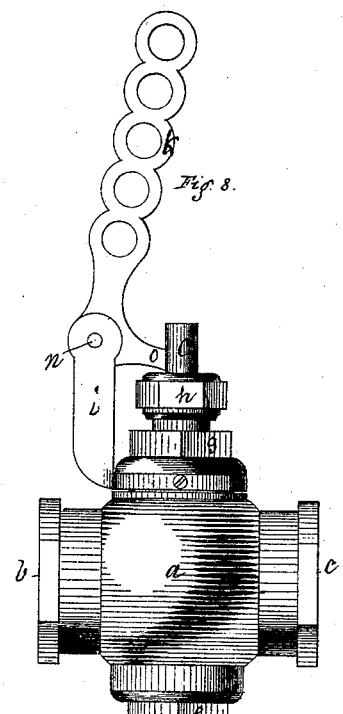

Figure 8 shows a side elevation of the above, all as heretofore made.

Figure 9:
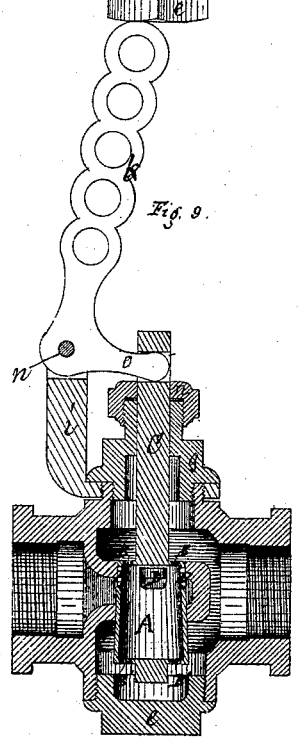

Figure 9, sheet 2, is a side sectional elevation, showing this my improvement.

Figures 2 and 3, sheet 1, show my improved conical hollow cylindrical valve, with its operating stem attached thereto.

The external appearance of this valve is very much like those solid valves heretofore made.

*a* is the body of the valve.

*b* is the induction-end or orifice.

*c* is the eduction-orifice.

*d d* are the valve-seats or openings, which are closed or opened simultaneously by the raising or lowering or opening or closing the valve.

*e* is a screw-cap, which closes the orifice *f*, through which the tool is introduced to mill out the valve-seats, and through which the valve itself is introduced into its proper place in the valve.

*g* is a cap through which the valve-spindle plays, and is fitted closely into the orifice *f'* directly over the valve-seats.

*h* is a cap fitted to the neck of the cap *g*, and serves to compress the packing around the spindle C.

*i* is a bracket secured to the neck of the orifice *f'*.

*k* is an angle-lever, the orifice *m* of which takes its bearing on the pin or screw *n* in the upper end of the bracket *i*.

The short end *o* of this lever is fitted into the orifice *o'* in the upper end of the valve-spindle.

A is a conical hollow cylindrical valve, having port-openings B in its upper end, and also through the periphery near its upper end; also, port-openings B' on its lower end.

This valve is connected to the stem C, and is operated by an angle-lever, *k*.

This valve A is also fitted to the openings or seats *d d*, so that, when closed, the orifices through the periphery will be just above the upper seat or orifice of the valve; and when, by the action of the lever *k*, the valve A through the stem C is depressed, the fluid will have a free and full flow through the orifices B B', fully equal to the capacity of the induction. Thus, the valve will allow a full flow of fluid equal to the capacity of the induction-pipe by a short movement of the valve.

I believe I have thus shown the nature, construction, and advantage of this invention, so as to enable others skilled in the art to make and use the same therefrom.

What I claim, and desire to secure by Letters Patent, is—

The hollow conical valve A, having ports B and B', substantially as and for the purpose specified.

ROBERT BERRYMAN.

Witnesses:
E. W. BLISS,
JEREMY W. BLISS.